Patented Dec. 22, 1925.

1,566,785

UNITED STATES PATENT OFFICE.

JOHANNES HENDRIK VAN DER MEULEN, OF ARNHEM, NETHERLANDS.

VULCANIZING FAT SUBSTANCES.

No Drawing.  Application filed July 14, 1923. Serial No. 651,617.

*To all whom it may concern:*

Be it known that I, JOHANNES HENDRIK VAN DER MEULEN, a subject of the Queen of the Netherlands, residing at Arnhem, Netherlands, have invented certain new and useful Improvements in Vulcanizing Fat Substances, of which the following is a specification.

The invention relates to a material consisting of a body and of a coating of a fat substance chemically changed by sulfur chloride vapor and to a process for producing such coating. The invention is particularly for the purpose of making a coating serving as a varnish or lacquer.

The present invention is applicable particularly for varnishing or lacquering leather, artificial leather, rubber goods, fabric or the like.

According to the invention a layer of the fat substance, such as oil or fat, or their derivatives, for instance the corresponding fatty acids, sulfurized oils (oleum lini sulfuratum), polymerized or oxidized oils or the like or mixtures of such substances with or without addition of drying agents, dyestuffs, resins, gums, rubber, or such materials which serve to increase the elasticity, the hardness or lustre of the coating, or materials serving as a diluent or solvent preferably themselves capable of being vulcanized, for instance turpentine oil or safrol, are applied to a suitable body and thereupon are exposed to the action of vapor of sulfur chloride at ordinary temperature or at a slightly elevated temperature. Preferably such treatment is effected under diminished pressure which can be done by bringing the material to be treated into a suitable vacuum chamber or apparatus which may be exhausted before or simultaneously with the introduction of sulfur chloride vapor. Provision may be made for introducing sulfur chloride in a liquid form into the vacuum chamber where it is vaporized under the diminished pressure, but care should be taken not to bring the liquid into direct contact with the coating as otherwise the coating would be spoiled.

Under the influence of the sulfur chloride vapor the coating of the fat or oil or the like is transformed into a lacquer or varnish which is quite stable towards various mechanical and chemical actions and has a particularly beautiful lustre, when indeed this lustre is not damped or prevented by suitable procedure in any case where desirable.

If it is desired to obtain a more dull lustre or lacquer the coating treated according to the invention may be put into water immediately or soon after the end of the vulcanizing action of the sulfur chloride, or certain substances, such as soot, may be added to the oil or fat forming the coating before the treatment with sulfur chloride vapor.

The process may be worked in the following manner: For instance, it may be intended to provide certain bodies as plates or sheets of leather, fabric, rubber, rubber regenerate, artificial leather with or without content of rubber, wood or any other suitable material with a coating having an intense lustre. For this purpose the sheets or plates are coated by hand with a brush or by aid of suitable apparatus or machine, such as a spreading machine, with the layer of a fatty, drying or non-drying or halfdrying oil or fat or with a mixture of such oils or fats with or without the required additions as mentioned above. The following oils and fats are particularly suitable for preparing the coating; linseed oil, rape oil, poppy oil, almond oil, olive oil, castor oil, cod-liver oil.

The bodies coated in any suitable manner are exposed to the action of sulfur chloride vapor in a closed vessel, preferably at diminished pressure.

If it is intended not to coat the entire surface of the body but to leave certain parts free of the coating it may be suitable or even necessary to protect such parts by suitable means against the action of the sulfur chloride. If for instance fabric is only to be coated on one surface the fabric may be previously impregnated with the strong solution of sodium carbonate and dried thereupon. If such impregnated fabric is coated on one side with the oil or fat and thereupon exposed to the action of sulfur chloride vapor the non-coated, but impregnated other surface is now resistant towards the sulfur chloride vapors.

The treatment with the sulfur chloride vapor is a comparatively short one and is ended in many cases in about twenty minutes.

If the coating according to the invention is to be applied to a body or article made from rubber the coating may be applied to the unvulcanized or partly vulcanized body or article and thereupon the treatment with sulfur chloride may be effected producing simultaneously a varnish or lacquer and the ordinary vulcanization of the rubber body. In this manner many rubber goods with the beautiful coating of lacquer or varnish may be produced in a simple manner. Substances known in the art of vulcanizing rubber and having the effect of either increasing or diminishing the time necessary for the vulcanization may be used in the process both as an addition to the coating or to the body if consisting in or containing rubber, so that a good coating and a good vulcanized article is obtained at the same time.

What I claim is:—

1. A process for producing a varnish coating on a body, consisting in coating the body with a vulcanizable oil and then vulcanizing the oil in situ with sulfur chloride vapor.

2. A process for producing a varnish coating on a body, consisting in coating the body with linseed oil and then vulcanizing the oil in situ with sulfur chloride vapor.

3. A process for treating artificial leather, consisting in coating the artificial leather with a vulcanizable oil and then vulcanizing the oil in situ with sulfur chloride vapor.

4. A process for treating artificial leather, consisting in coating the artificial leather with linseed oil and then vulcanizing the oil in situ with sulfur chloride vapor.

5. A process for producing a varnish coating on a body, consisting in coating the body with a vulcanizable oil and then vulcanizing the oil in situ with sulfur chloride vapor under diminished pressure.

6. Material consisting of a body and of a lustrous coating on such body comprising a vulcanizable oil vulcanized in situ by sulfur chloride vapor.

7. Varnished artificial leather of which the varnish consists of a layer of vulcanizable oil vulcanized in situ by sulfur chloride vapor.

In testimony whereof I have affixed my signature.

JOHANNES HENDRIK van der MEULEN.